M. B. NEUMEISTER.
SECTIONAL PIE PAN.
APPLICATION FILED AUG. 17, 1920.
1,397,775.
Patented Nov. 22, 1921.
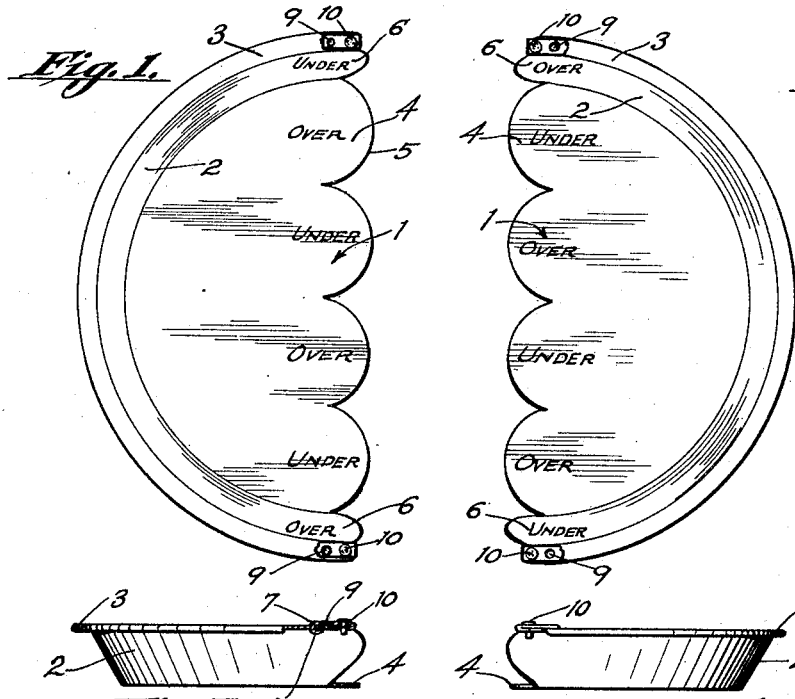
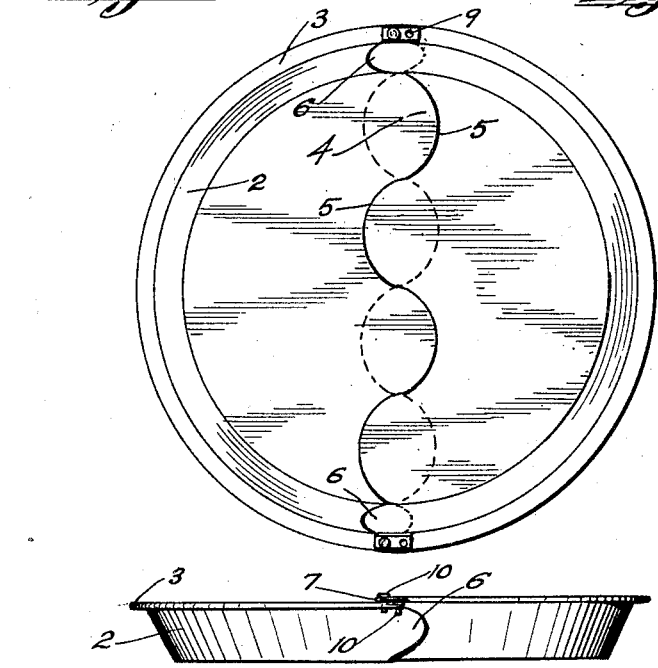
Inventor
MAY BELLE NEUMEISTER.
By Hazard & Miller
Attorneys.

UNITED STATES PATENT OFFICE.

MAY BELLE NEUMEISTER, OF LOS ANGELES, CALIFORNIA.

SECTIONAL PIE-PAN.

1,397,775. Specification of Letters Patent. Patented Nov. 22, 1921.

Application filed August 17, 1920. Serial No. 404,115.

*To all whom it may concern:*

Be it known that I, MAY BELLE NEUMEISTER, a citizen of the United States, residing at Los Angeles, in the county of Los Angeles and State of California, have invented new and useful Improvements in Sectional Pie-Pans, of which the following is a specification.

This invention is a sectional pie pan consisting of sections, duplicate of one another, and readily assembled to form the pie pan, or taken apart to remove the pie from the pan, thus eliminating all danger of breaking or marring the crust in removing the pie from the pan.

The invention will be readily understood from the following description of the accompanying drawings, in which—

Figures 1 and 2 are plan views of the duplicate pie pan sections adapted when assembled to form a pie pan.

Figs. 3 and 4 are side elevations of these pie pan sections.

Fig. 5 is a plan view of the assembled pie pan.

Fig. 6 is a side elevation of the same.

The pie pan sections are duplicates of one another and each forms half of the assembled pie pan.

Each of these sections consists of a base 1, preferably semicircular, and an upstanding rim 2, terminating in the outwardly extending flange 3. The edge of a pie pan section forming the meeting edge with the other of said pie pan sections when assembling the pie pan, consists of a plurality of outwardly projecting surfaces 4. The surfaces may be alternately stamped with the words "Under" and "Over," so as to give a clear understanding as to the method of assembling the pie pan. The edges of these surfaces are preferably curved, as shown at 5, with the edge of one of said surfaces adjacent the edge of the next surface. The edge of rim 2 which forms a meeting edge with the other section of the pie pan is similarly formed with an outwardly projecting surface 6 having a curved outer edge.

The ends of flange 3 of a pie pan section are, preferably, reversely bent upon the flange as shown at 7, and hooked in said flange as shown by 8, with the ends of said reversely bent portions forming reinforcements. An aperture 9 extends through flange 3 at the reversely bent portion thereof provided at each end of the flange, and a stud 10 extends through said reversely bent portion of the flange beyond each of apertures 9, said studs preferably projecting below the surface of the flange.

When the pie pan is to be used the two sections are brought together with the parts marked "Under," "Over" upon one section lapped alternately under and over the parts marked "Over," "Under" of the second section. The underlying studs are then gently forced through the overlying apertures thus holding the sections firmly together so that the pie pan can be lifted with no danger of collapsing thereby preventing the contents escaping through the joints between the sections.

It will be understood that the projecting surfaces 6 and the flange ends 3 of one section will overlie the underlying similar parts of the other section. It will be also observed that the pie pan in interchangeable in that the sections may be assembled from right to left and from left to right thus using either coöperating stud and aperture according to the manner of lapping. Thus for example in case the projecting surfaces become curved from use the pie pan may be assembled in the reverse direction so that the underlying portions become the overlying portions and vice versa. This change in the method of assembling will bend the projecting surfaces back to proper position. The pie pan when thus assembled afford a rigid construction in which the overlapping portions of the respective sections form bracing means for the sections relative to one another.

When the pie pan is to be used for baking a pie or the like the baking is performed in the usual manner, and when the contents of the pan is to be removed the pie pan is placed upon a plate or the like. By means of a knife point or similar tool the fastenings at each end of the joint sections may be released thereby allowing the pie pan sections to become loose from the contents of the pan so that the sections may readily be removed from under the contents. This operation may be performed with a minimum danger of breaking or marring the contents of the pan, since no weight rests upon the crust of the pie in removing the same.

Various changes may be made without departing from the spirit of the invention as claimed.

What is claimed is:

A pan comprising separate sections, each having an annular flange, the meeting edges of said sections each having a plurality of projecting surfaces, said surfaces and the meeting ends of said flanges being arranged to overlap for forming the assembled pan, each of the ends of said flanges having an aperture and a stud beyond said aperture adapted to be received in the aperture provided in the adjacent end of the other flange.

In testimony whereof I have signed my name to this specification.

MAY BELLE NEUMEISTER.